M. R. HUTCHISON.
CAM OPERATED HORN.
APPLICATION FILED NOV. 13, 1915.
Reissued Dec. 28, 1915.
14,037.
2 SHEETS—SHEET 1.
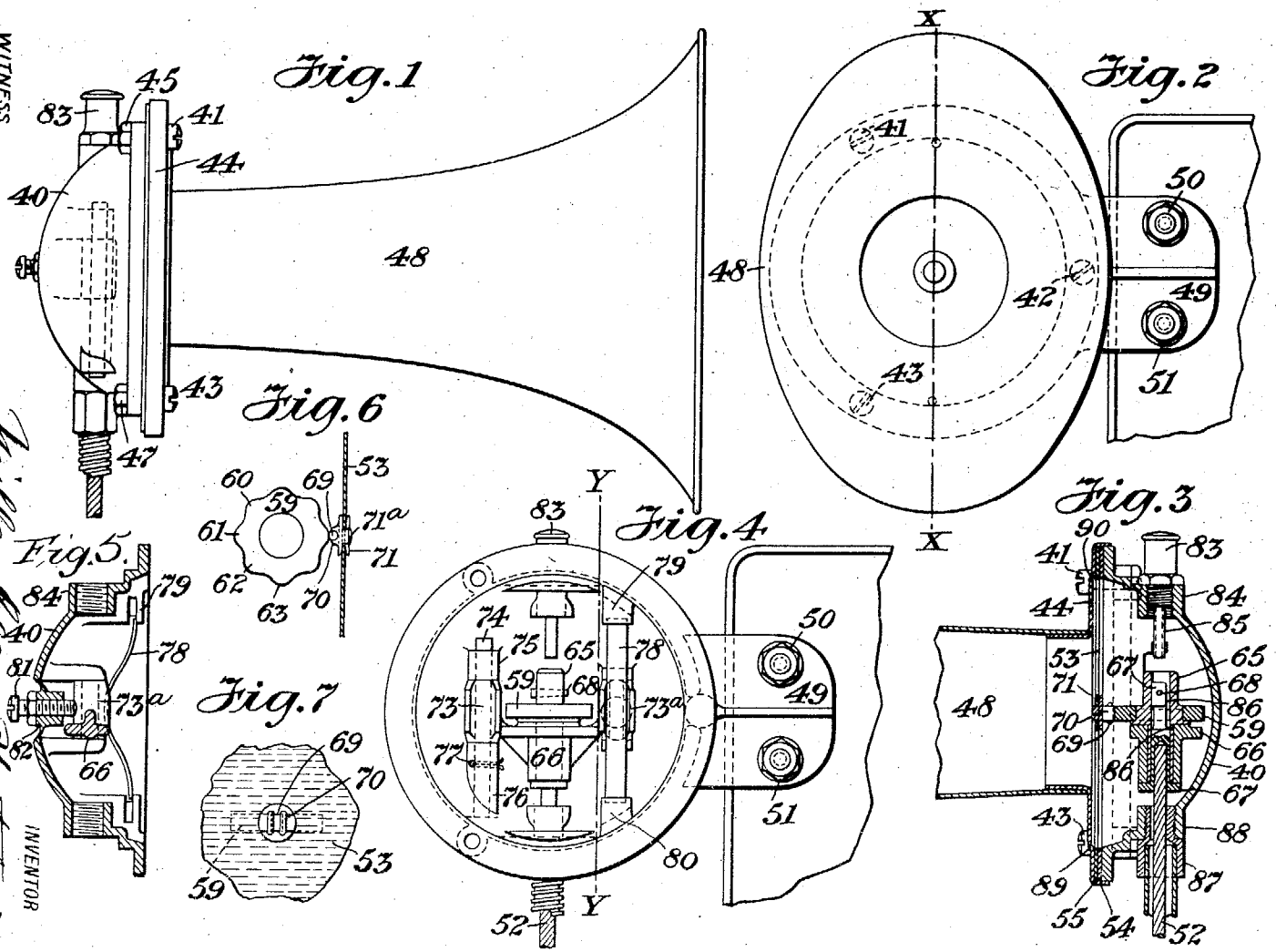
WITNESS
Chas. F. Clagett
INVENTOR
Miller Reese Hutchison
BY HIS ATTORNEY
Geo. E. A. Meau M. R. HUTCHISON.
CAM OPERATED HORN.
APPLICATION FILED NOV. 13, 1915.
Reissued Dec. 28, 1915.
14,037.
2 SHEETS—SHEET 2.
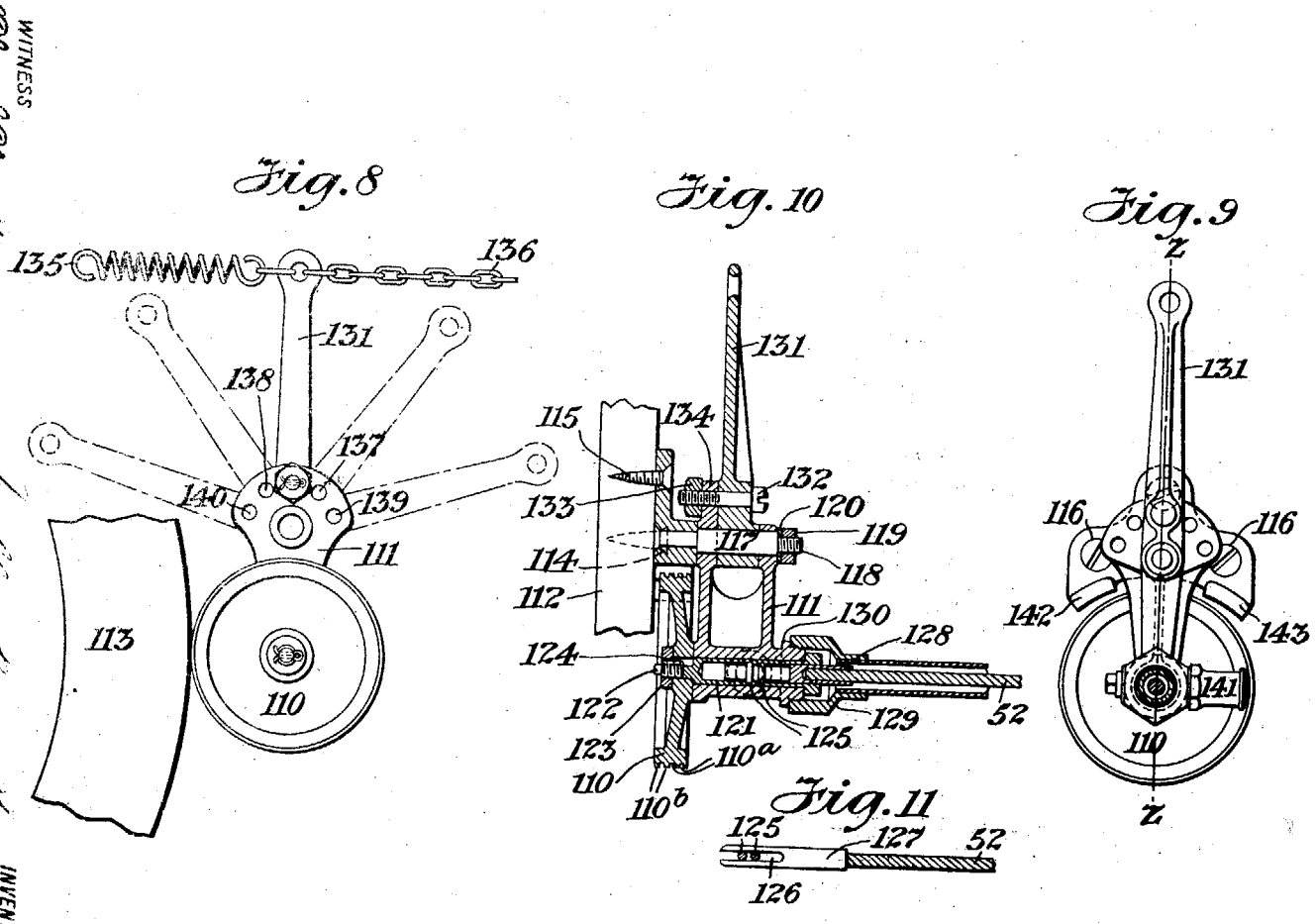
WITNESS
Chas. F. Clagett
INVENTOR
Miller Reese Hutchison
BY HIS ATTORNEY
George C. Meade

UNITED STATES PATENT OFFICE.

MILLER REESE HUTCHISON, OF WEST ORANGE, NEW JERSEY, ASSIGNOR TO LOVELL-McCONNELL MANUFACTURING COMPANY, A CORPORATION OF DELAWARE.

CAM-OPERATED HORN.

14,037. Specification of Reissued Letters Patent. Reissued Dec. 28, 1915.

Original No. 923,049, dated May 25, 1909, Serial No. 373,946. Application for reissue filed November 13, 1915. Serial No. 61,424.

*To all whom it may concern:*

Be it known that I, MILLER REESE HUTCHISON, a citizen of the United States, and a resident of West Orange, in the county of Essex and State of New Jersey, have invented certain new and useful Cam-Operated Horns, of which the following is a specification.

My present invention concerns horns, signals, alarms, etc., wherein the sound is produced by a mechanically agitated diaphragm. It includes certain novel features of construction and operation whereby the power necessary to produce vibrations of high velocity and great amplitude may be applied to a diaphragm to produce sounds of intensity and carrying power, such as are necessary to make the device useful for purposes now served by automobile and launch horns, or by steam boat, locomotive, and factory whistles, or by fog horns for light houses.

An elastic diaphragm is a very efficient instrument when proportioned and used for very delicate work as in the phonograph, where the diaphragm movements are of very small amplitude and all tendency to free movement is completely suppressed. If free movement be permitted, collision ripples and noises are produced which, while very intense, lack carrying power, and the attendant elastic stresses may be very great. In the case of a diaphragm used for my purposes, the elastic stresses may be so great that it becomes an important object to get enough sound out of the instrument without breaking the diaphragm or driving mechanism. For my purposes I found that it was entirely insufficient to merely employ stronger materials and larger sizes and I did not accomplish the desired result until I invented the new construction and method of operation whereby I utilized entirely different qualities of the diaphragm which I will explain.

The loudness of the sound and its carrying power both vary with the amplitude and velocity of the movement of the diaphragm. In practice, great amplitude of diaphragm movement is easiest obtainable with a low note, but too low a note is not effective in exciting the human ear and the louder it is the more disproportionately great will the energy of each wave have to be in order to produce a given human ear or loudness effect. With too high a note, it is difficult to get great amplitude, and, in practice, I find that the desired notes or frequencies of vibration lie within certain definite limits. I also find that for frequencies within those limits the diameter and thickness, and the resulting weight and stiffness of the diaphragm are still further limited, since increased weight or stiffness of the vibrating parts tends to cut down the velocities and amplitudes which can be attained without developing destructive inertial and elastic stresses. Hence, I will describe hereinafter an illustrative example of a diaphragm having the required thinness and other essentials and show how it can be given the required amplitude and velocity of movement without destroying itself or the driving member. For any given diaphragm thus selected, the amplitude of vibration which is possible, without exceeding a given safe limit of elastic stress, is very much greater when the vibratory portions of the diaphragm swing as a whole simultaneously in the same direction, than when the vibration consists mainly of ripples or ventral segments, which cause different portions of the surface to move simultaneously in opposite directions. Hence, I prefer to arrange the diaphragm displacing member so as to apply the power mainly in producing the bodily vibration of the diaphragm, so that any high frequency vibrations are merely secondary or incidental. Being of lower frequency the sound waves generated by this bodily vibration are of inferior quality for exciting the human ear, but they "carry" better in the air and I have succeeded in increasing the velocity and amplitude of the bodily movement of the diaphragm so as to put enough more energy into each air wave to far more than compensate for its inferior audibility, while relatively diminishing the high frequency ripple vibrations which are of disagreeable quality and inferior carrying power. As a displacing means, I employ a cam having a thrust or dynamic reaction sufficiently direct to give a large resultant perpendicular to the surface of the diaphragm, instead of using roughened or corrugated surfaces which operate mainly by friction and scraping and so produce the high frequency ripple vibrations rather than the bodily movement.

I find that the cam may be designed and arranged to effect bodily displacement of the diaphragm through the required perpendicular distance at the required high velocity with a minimum of lateral thrust, and yet to get out of the way of the diaphragm rapidly enough to permit the required amplitude and velocity of elastic return thereof, and to repeat these operations with sufficient rapidity to generate a true body swing note as the principal sound produced, the high frequency noises and ripples being entirely secondary and for long distance signaling practically negligible. I believe I am the first to discover the desirability of doing this, and also that I am the first to design, construct and operate a cam, diaphragm and contact piece capable of doing it.

The cam is preferably of low operative pitch on the advancing side, and the corresponding contact surfaces on the diaphragm are preferably near the plane of the diaphragm. A specially designed hardened contact surface is arranged on the diaphragm. The rotary cam can be more conveniently arranged for getting out of the way of the return movement of the diaphragm when this contact piece is made in the form of a projection. The shape of its surface of contact with the rotary member and the ratio of its altitude to its base should be such that the lines of thrust or dynamic reaction perpendicular to said surface of contact, will fall within the base of the projection and preferably as near as possible to the center thereof, though these features will vary as explained hereafter. The engaging surfaces are shaped for straight line contact.

The advantage of having the line of thrust or dynamic reaction fall within the base of the projection is that in such case the thrust operates as if applied within the plane of the base at the point where the line of thrust intersects such plane, whereas when the line of thrust falls outside of the base, there is a positive pull of the diaphragm toward the cam on the opposite side of the point of attachment, and by reason of the arrangement of leverages, this pull on one side is added to the normal thrust of the cam on the other side, thereby producing a distinct reverse bend, the crests of which are localized at diametrically opposite points of engagement with the base of the projection.

It will be understood that each of the above described factors mutually contribute in varying degrees to the production of the desired result, and that while theoretically it would be preferable to perfect each and all of them to the greatest degree, the exigencies of practical operation require, and the theory permits, that there be considerable variation in one part, provided it be compensated for by greater perfection of form or arrangement of some other part of the combination.

In practice, the above principles may be embodied in a device wherein the diaphragm is positively displaced out of normal on the same side of normal by each cam projection, so that each bodily displacement of the diaphragm causes a clearly defined acoustic impulse or wave of great amplitude and carrying power, and these waves or impulses succeeding each other, constitute a note of a pitch determined by the number of cam contacts per second. The frequency of these, as I will explain later is determined by the time required for sufficiently completing the natural cycle of rearward swing of the diaphragm. Application of the power in this way gives a movement of the diaphragm which involves comparatively smooth, regular flexure of the material and thus causes the least possible breaking stress for a given amplitude of movement.

My present invention also contemplates a new organization of parts particularly adapted for application to any desired part of a vehicle or boat. It also contemplates a considerable number of structural improvements coöperating to constitute a practical device adapted to stand the wear and tear under all conditions of use.

Referring to the drawings: Figures 1 and 2 are respectively side and front elevations of a form of the device; Fig. 3 is a section on the line X—X, Fig. 2; Fig. 4 a face view of the case with the horn and front wall removed; Fig. 5 a vertical broken section near the line Y—Y, Fig. 4; and Figs. 6 and 7 are details of the diaphragm and cam contact piece on the diaphragm. Figs. 8 and 9 are front and rear views of a driving mechanism for the flexible shaft; Fig. 10 a vertical section on the line Z—Z, Fig. 9; Fig. 11 a detail on Fig. 10.

In the form shown in Figs. 1 and 2, an amplifier or resonating horn 48 is suitably secured to a casing 40. Between the horn and casing is a diaphragm 43, which in addition to its vibratory function, forms with the casing a resonator amplifying chamber.

The diaphragm 53 is vibrated by rotary cam 59 formed with regularly spaced cam projections 60, 61, etc., the sides of each projection being similarly and symmetrically formed, so that the cam is adapted to rotate in either direction. The diaphragm is provided with a diaphragm projection, formed with contact surfaces which are inclined similarly and symmetrically in both directions from the apex thereof.

By reason of the symmetrical formation of the cam projections on the rotary cam and of the contact surfaces on the diaphragm projection, the device is adapted for operation in which ever direction the rotary cam may happen to be driven. The inclination or operative pitch of both members is low, so that the lines of thrust perpendicular to the surfaces of the cam and diaphragm projection, at points where they come into engagement with each other, will fall within the base of the projection.

As will be seen from Fig. 6, the cam surfaces are formed with alternate concave depressions and convex projections with intervening surfaces of smoothly graduated rate of change of pitch. The projections are symmetrically rounded and the vibrator may be actuated by rotation of the cam in either direction. Where the power is always applied in one direction, however, the cam surface on the rear side of each projection may be entirely cut away without materially altering the operation of the device, especially where the speed of rotation and the spacing of the projections are such that the rate of displacement by the cam approximates the natural rate of elastic swing of the diaphragm.

I have shown a desirable arrangement of horn, diaphragm, and cam actuating means adapted for attachment to the dashboard of an automobile, the construction being so far symmetrical and reversible as to permit of convenient attachment on either the right hand or the left hand of the vehicle. This device includes a brass or other casing 40, drilled to receive screws 41, 42, 43, which hold the front 44 to the back 40 by nuts 45, 46, 47. The horn 48 is attached to the front 44 and is supported thereby. The entire device is supported by a bracket 49 attached to the dashboard or other support by bolts and nuts 50, 51. The flexible shaft 52 transmits the power from the source to the rotating cam.

The diaphragm 53, preferably consisting of or plated with non-corrosive material, is held between cork or other washers 54 and 55, which are clamped between the case 40 and front 44 by the screws 41, 42, 43. These washers provide a properly cushioned support for the diaphragm, and also serve to exclude water, dust, etc., from the interior of the case. Their principal function, however, is to prevent the rapid destruction of the diaphragm, which is apt to result when the violently vibrating body is rigidly clamped between rigid metal surfaces.

The cam 59 is preferably of hardened steel, and is formed with cams 60, 61, 62, etc., of such pitch, depth, and shape as are best suited to produce a note of the desired amplitude and pitch at the contemplated speed of rotation without producing unnecessarily violent stresses of the diaphragm. The cam 59 is attached to or is part of a hollow spindle 65, rotating in the bearing 66, and actuated by shaft 52, through the ferrule 67 and the pin 68, which secures the latter to the hollow spindle 65.

The cam piece or anvil on the diaphragm, consists of a piece of self-hardening steel rod 69, secured in a soft metal support 70, preferably by hammering the material of the latter into close engagement therewith. The support 70 is in turn attached to the diaphragm 53 by a washer 71 over which the end of the soft metal support 70 is riveted, as at 71[a]. 69 is let into 70 in such manner as to make it impossible for the softer metal of 70 to come into contact with cam 59. If desired, the cam piece 69 may be made free to turn in 70 so as to present fresh surfaces or to act as a roller bearing. The surfaces of 70 and 71 adjacent to the diaphragm 53, may be convex to prevent shearing action thereon.

As cam 59 revolves, the diaphragm 53 is bodily displaced in a direction substantially normal to the plane thereof, which in this case is substantially radial to the axis of the cam.

In practical operation, the longitudinal axis of the cam piece 69 of the diaphragm 53, should be parallel with the axis of rotation of the cam 59 so that the wearing surface will extend entirely across the width of the latter. The journal of the rotary cam is formed in a bracket 66, which is hinged at one end 73 upon a pin 74 passing through lugs 75, 76, and secured by a split pin 77. In order that this journal bracket may be reversible, the two ends 73, 73[a], are each drilled to receive the pin 74 and are each formed with seats for the spring 78. The bracket 66, being pivoted at one end, the free end 73[a] is spring pressed backwardly by spring 78, engaging lugs 79 and 80, on casing 40. The extent of this rearward movement is determined and set by adjusting screw 81 threaded into the back side of the case at 82 and bearing upon 66. By these means the cam 59 may be adjusted nearer to or farther from the diaphragm cam surface 69. Locking nut 82 is provided for locking screw 81 in any desired, predetermined position.

The device is thoroughly lubricated by means of the oil cup 83, secured in threaded lug 84. The oil flows therefrom through pipe 85 and drips into the hollow spindle 65, then through oil way 86 to the bearing surfaces between 65 and 66. From this point some of it passes by centrifugal force out to the periphery of the cam, passing between the faces of the rotating and fixed elements until it reaches the side of the cam whence it passes outward along its face the remainder flowing or draining downwardly, thereby lubricating the remainder of the bearing surface.

The hole for the attachment of the oil cup is exactly similar to and symmetrical with that for attachment of the flexible shaft, so that the location of these parts may be reversed when it is desired to attach the horn to the left side of the dashboard, instead of the right side.

Referring to Fig. 4, wherein the oil cup 83 is at the top and the drive shaft 52 at the bottom of the casing, it will be seen that to adapt the device for location on the dashboard on the opposite side of the machine, it may be turned upside down, so that the bracket 49 projects to the left instead of to the right. The operating parts may then be reversed.

Drain openings at 89 and 90 afford an outlet for any water or small particles of dirt which may tend to collect between the diaphragm 53 and the front 44. By having one at the top and the other at the bottom of the casing, there will always be one of them in operative position which ever side of the device happens to be downward in normal operation.

The cam shaft may be actuated after the manner indicated in Figs. 8, 9, 10, and 11, wherein the shaft 52 is shown connected to a pulley 110, journaled in the hanger 111, which is adapted to be secured to any desired support 112 adjacent a rotating part of the engine, such as the fly wheel 113, in such manner as to permit the pulley 110 to be thrown into and out of contact with said fly wheel.

In the specific form shown in the drawings, the base 114 is secured to the support 112 by screws 115, 116. This base is provided with a cylindrical pivot or projection 117, upon which the hanger 111 is mounted to swing, said cylindrical projection being formed with a screw thread 118 for engaging a nut 119 and washer 120. In the lower end of the hanger is journaled the hollow shaft 121. Upon the projecting end 122, of shaft 121, is secured the friction wheel 110 by means of a nut 123 and key 124. This shaft is provided with transverse pins 125, engaging a slot 126 in a coupling piece 127. Into the recess 128 in the rear end of said coupling is soldered the flexible shaft 52. The flexible protecting cover for the flexible shaft is secured to a sleeve 129, which screws over a screw threaded boss 130 on the rear of the bearing.

The means of swinging the hanger 111 to throw the friction wheel 110 into and out of contact with the fly wheel 113 is an upward extension or lever arm 131. This arm may be integral with the hanger 111, but I prefer the construction shown in the drawings wherein the arm 131 is mounted upon the pivot 117 and is coupled in fixed angular relation to the hanger 111 by means of the bolt 132 and nut 133 passing through a registering hole in the integral projection 134 of hanger 111. The lever arm 131 is controlled by a retractile spring 135 acting to move said arm in one direction and the chain 136 acting to move it in the other.

I preferably arrange the spring 135 so that it will normally tend to hold the friction wheel 110 out of engagement with the fly wheel 113, the chain 136 being used to effect a positive movement of the friction wheel 110 in the opposite direction whenever it is desired to sound the horn, but this is not essential. In order that this driving mechanism may be applied at any most convenient point about the periphery of the fly wheel, the projection 134 is provided with any desired number of bolt holes 137, 138, 139, 140, etc., so that the lever arm 131 may be secured in any desired angular relation to the hanger 111 by merely shifting the bolt 132. By these means it is possible to arrange matters so that a convenient support 112 may always be found and at the same time the direction of the pull of the chain 136 may be kept normal to the lever arm 131. The oil cup 141 supplies the bearing in 111 as indicated in Figs. 9 and 10.

I prefer to arrange brake shoes 142, 143, on opposite sides of the pivot 117, so that the friction wheel 110 will be swung into contact therewith immediately upon being thrown out of contact with the fly wheel 113.

The periphery of the friction wheel 110 is formed with grooves $110^a$ and ribs $110^b$, so that the ribs may come into close frictional contact with the surface of the fly wheel 113, and any lubricant or other foreign matter on such surface will be squeezed into the grooves $110^a$ at the point of such contact.

It will be obvious that instead of the fly wheel 113, I may enploy any suitable driving mechanism, it being for many purposes preferable that said member be operated by hand or by other means.

A very desirable material for the diaphragm is a fine quality steel about 2/100 to 3/100 inch in thickness dependent on the diameter. In practice such thin steel always has a pronounced longitudinal grain or fiber and in order that the diaphragm may be less likely to crack or break, the longitudinal axis of the wearpiece 69 is arranged transversely to the direction of the grain of the diaphragm (see Fig. 7), so that any small lateral component of the power applied through the cam 59 and any vibratory stresses which may take effect in directions other than perpendicular to the diaphragm shall take effect longitudinally of the grain in the direction of greatest strength of the fiber.

All of the structural features herein set forth are of advantage during starting and stopping when there is no timing of the cam contacts, and the same is true as to the refinements of design and operation of the rotary cam which adapt it to accord with the natural movements of the diaphragm and to vibrate on both sides of normal.

One way of getting a very desirable proportion and operation of the cam which will give good sound effect with minimum wear on the diaphragm is as follows: A diaphragm constructed as above described, of fine quality thin steel, is selected of a diameter, thickness and elasticity suitable to give it the desired pitch and loudness of note and the other qualities first above described. Such a diaphragm will be so flexible that when struck it will vibrate readily in ripples or segments of almost any frequency, but when forcibly bent, as a whole, in one direction, has a fairly definite natural time of free elastic return, and greater amplitude of movement, with less power and less wear and tear, may be obtained where part of each vibration is forced and part of it is free and the forced part of the successive vibrations occur at intervals harmonizing with the time required for the free parts of the movement. For such harmonized operation, the forced part of the movement must not be varied to an extent sufficient to prevent swing of the diaphragm on both sides of normal. If the cam contacts be caused to occur too frequently, they will intercept the elastic return movement of the diaphragm and again forcibly drive it outward before it has completed its nautral cycle of movement and I sometimes do this but never to an extent sufficient to prevent the return movement from extending across normal. Because if the diaphragm movement is confined wholly to the outward side of normal, the elasticity of the diaphragm being always toward normal, acts continuously inward in opposition to the cam pushes, and never in the same direction with them; and the rearward movement is cut short at the instant when its rearward momentum is greatest and when stopping it will produce the maximum violence of collision and noise-producing ripples of the diaphragm. Such operation would diminish the body swing note which I desire to magnify, magnify the ripples which I desire to diminish and would be attended by maximum destructive effects and waste of power.

When the diaphragm swings across normal, however, its elastic tendency reverses direction. Hence, by as much or little as I permit the diaphragm to continue its rearward swing back of normal, by just so much will I store up and save the rearward momentum by using it to bow the diaphragm rearwardly where its elasticity acting outwardly, will add to instead of oppose the outward push of the cam. Likewise and by so much, the velocity, destructiveness and ripple producing effect of diaphragm and cam impact will be diminished, and the velocity and amplitude of the body swing increased.

A desired amplitude of vibration of the diaphragm may be selected by trial, which will not impose stresses in excess of the elasticity thereof. The cam may then be designed so that its operative throw in a direction perpendicular to the diaphragm will be approximately equal to the desired selected amplitude of vibration. A cam of reasonable diameter and peripheral speed may be selected having long smooth cam surfaces of low operative pitch.

In the preferred operation, the principal movement of the diaphragm is a to and fro bodily movement in which the movements in one direction are forced by the cam and the return movements are resilient and preferably the cam contacts force the outward movements as fast as the elasticity can effect the return to the initial position above described. Each outward movement is of forced amplitude and the return movements and the frequencies conform more or less closely to those of free elastic vibration of the diaphragm.

It will be understood that the cam need not be formed and adjusted so that the contact piece will remain in contact with or follow the periphery of the cam, since very fine results may be achieved by my present device, where as shown in Fig. 6, only the outermost portions of the cam projections will engage the contact piece or anvil in its normal position. In this device, when the cam is driven at the above described normal full speed, where the movements and the frequencies conform more or less closely to those of free elastic vibration, and the action is practically and substantially harmonized, the diaphragm is thrown clear of the top of the cam at high velocity, and the cam depressions are deep enough so that the movement of the diaphragm is free and natural up to the time of engagement with the next succeeding cam. With the above described cam having an operative throw or altitude approximately equal to the desired amplitude of vibration, good results may be obtained by trial adjustments of the distance of the cam from the diaphragm and rotation of the cam at a speed which will give the required number of cam contacts per second.

The motive power herewith shown is adapted to permit slip or variation of the speed of the cam, and this is of advantage in connection with my above described outfit adapted to operate near the natural vibratory rate of the device, because it permits the speed to automatically accommodate itself more or less to such natural rate of vibration. Hence, when desired, the operator may the more easily adjust the pressure on the friction wheel so as to select and hold the right speed for natural frequency operation of the diaphragm.

When the wearpiece on the diaphragm is of very small altitude as compared with its base, the pitch of the cam surfaces may be increased, but the ratio of base to altitude is approximately one to one or less, and in most cases I prefer to have the ratio of about two to one. This factor is of less importance where the diaphragm and rotary cam are operating perfectly "in phase" so that the cam forcing movements occur only during the natural outward swing of the diapragm but is of greater importance in case of "out-of-phase" operation due to wide variations of speed in starting or stopping or to excessive speed or faulty adjustment while running.

It will be understood that the thrust or displacement of the diaphragm is a function of the shape and arrangement of both the driving and the driven members and that in the drawings the cam action results from development of the cam surfaces on both members. Obviously, the proportion of the cam thrust afforded by each is capable of wide variation between the extremes where all of the cam thrust or displacement is afforded by one member or by the other member.

A very desirable material for the diaphragm is a fine quality steel about 2/100 to 3/100 of an inch in thickness. This material is very durable, especially when properly clamped between the cork washers 54, 55 of Fig. 3. A diaphragm of about 2/100 inch thickness and about 6 inches in diameter, clamped at the periphery so as to leave about 5 inches clear, is well adapted for satisfactory operation at an amplitude of one to two sixteenths of an inch by cam displacements occurring at frequencies of, say 400 per second. While the above proportions are illustrative and the sizes can be varied to some extent the practically permissible variations are restricted by the limitations first above described. For instance, the diaphragm may well be somewhat thicker than 2/100 inch but at the suggested upper limit of 3/100 inch it will be very heavy and stiff and this will render it more destructive and ill-adapted for my purposes in the other particulars, which I have explained.

While I have herein above set forth certain desirable principles of proportioning of parts and rates of operation thereof, it will be understood that many of the structural features of my present invention do not depend upon such special matters. It will also be understood that while I have herein fully shown and described, and have pointed out in the appended claims certain novel features of construction, arrangement and operation which characterize my invention, it will be understood by those skilled in the art that various changes may be made without departing from the scope of my claims.

The above described diaphragm as a separate article is claimed in my Patent No. 883,643, granted March 31st, 1908, but as stated in said patent, the broader subject matter of the combination of such diaphragm with the rotary cam has been reserved for this application. The claims hereof though related to certain of the broader claims of my companion application Serial No. 305,933, filed March 14th, 1906, (patented May 25, 1909, No. 923048) are distinguished therefrom in that the claims hereof are directed to the cam as a means for agitating the diaphragm.

I do not claim herein the features of resonator with base of large diameter or with flared end, nor do I claim the drain holes for the front wall of the diaphragm case, either separately or in combination with the diaphragm and cam, the specific claims for these being found in my Patent No. 957,161, granted May 3rd, 1910.

Claims limited to the electric motor as the means for driving the cam are found in Patent No. 923,122, granted May 25th, 1909. They are based on a device in which every cam projection forces full outward movement of the diaphragm at all speeds thereby adapting it to produce resonant sound effects at every speed corresponding to any one of the natural frequencies of the horn or of the diaphragm.

Claims limited to the combination of the electric battery, the electric motor, the rotary cam and the diaphragm coördinated so that they will automatically operate at a speed giving cam contacts approximating the natural or fundamental frequency of the diaphragm, are found in my application Serial No. 571,188, (patented Nov. 16, 1915, No. 1,160,899) which is for subject-matter originally contained in my application Serial No. 494,120, filed May 5th, 1909, (patented Nov. 16, 1915, No. 1,160,900) and copending with my original application for Patent 923,049 of which reissue is herein sought.

The herein described novel features of construction and of relative arrangement and interaction of the parts, as well as the sounds produced thereby, are all in marked contrast to the phonograph and to all other prior devices employing a diaphragm with a rotor pushing in the outward direction only. In the phonograph all free or natural movement of the diaphragm is perfectly suppressed, and all other prior devices follow the phonograph to the extent that in all of them the movement of the diaphragm is confined wholly to one side of the normal equilibrium position, and intermediate springs, cushions or levers are employed which destroy the simplicity and directness of action and reaction required for my purposes; and I disclaim any and all such prior devices.

My device includes a steel diaphragm so thin and flexible considering its air displacing area, that for my purposes it requires a push for every swing; also a high speed rotary cam having cam contact surfaces arranged to propel the diaphragm directly outward and to have direct action and reaction in respect thereto, formed so that the interval and the depth between the cam contact surfaces is sufficient for the diaphragm to swing rearwardly of normal, and set so that only the outermost portions of the cam projections will engage the contact piece or anvil when it is in the normal position, in combination with driving means selected and designed so that it can drive the cam up to, and hold, a desired speed where the movements and the frequencies approximate those of free elastic vibration of the diaphragm. The successive cam depressions are deep enough, and, at such speed, the cam allows time enough, for the rearward momentum of every swing to more or less expend itself in bowing the diaphragm an appreciable distance behind normal where its elastic tendency will be outward regardless of whether or not the rearward movement has completely exhausted itself; and the successive cam projections come along fast enough to apply their outward pushes in the same direction with such outward tendency thereby producing cumulative effects and maintaining a continuous succession of amplified approximately uniform body swings of the diaphragm.

I claim:

1. In an alarm or signaling apparatus of the class described, an elastic diaphragm, a rotary cam, and a contact piece rigidly secured on the diaphragm, the relative positions of the diaphragm projection and the cam, and the formation of the contacting surfaces of each being such that the parts have straight line contact along lines parallel with each other and with the axis of the cam, for the purpose described.

2. In an alarm or signaling apparatus of the class described, an elastic diaphragm, and a contact piece thereon, in combination with a rotary cam, the contact surfaces of said cam and of said contact piece being formed on substantially parallel lines, together with transverse studs or bolts engaging suitable openings at the periphery of said diaphragm and adapted to maintain the parallel relation of the contact lines of said diaphragm contact with the contact lines of said cam, for the purpose described.

3. In an alarm or signaling apparatus, a thin elastic steel diaphragm and a projecting wear-piece secured thereto, in combination with means for causing wide bodily swings of said diaphragm, said means comprising a rotary cam having a plurality of spaced projections having cam surfaces of a pitch adapted to apply direct outward thrusts to said wear-piece on lines falling within the base thereof, the engaging surfaces of said wear-piece and cam being formed on transverse straight lines, means for mounting said parts in position for straight line engagement, and with only the outermost portions of the cam projections overlapping the normal position of said wear-piece, driving means of the type adapted to accommodate its speed to the work done on the diaphragm, designed and relatively proportioned so as to start said cam and speed it up to the limited range of high speeds, where each successive cam projection applies a cam push for each successive rearward swing of the diaphragm, for the purpose described.

4. In an alarm or signaling apparatus, a thin elastic steel diaphragm, a wear-piece secured through and carried by said diaphragm, in combination with means for causing wide bodily swings of said diaphragm, said means comprising a rotary cam having a plurality of spaced projections having cam surfaces of a pitch adapted to apply direct outward thrusts on lines falling within the base of said wear-piece, means for mounting said cam with only the outermost portions of the cam projections overlapping the normal position of said wear-piece, driving means of the type adapted to accommodate its speed to the work done on the diaphragm, designed and relatively proportioned so as to start said cam and speed it up to the limited range of high speeds, where each successive cam projection applies a cam push during the rear-of-normal part of each successive body swing of the diaphragm, and means for minutely adjusting the degree of the overlap of said outermost portions of the cam projections, while said cam is running, for the purpose described.

5. In an alarm or signaling appartus, a thin elastic steel diaphragm, a wearpiece carried by said diaphragm, in combination with means for causing wide, bodily swings of said diaphragm, said means comprising a rotary cam having a plurality of spaced projections having cam surfaces of a pitch adapted to apply direct outward thrusts to said wear-piece on lines falling within the base thereof, the engaging surfaces of said wear-piece and cam being formed on transverse straight lines, means for mounting said parts in position for straight line engagement, means for adjusting the overlap of the tips of the cam projections in a direction perpendicular to the straight line elements of said wear-piece, driving means of the type adapted to accommodate its speed to the work done on the diaphragm, designed and relatively proportioned so as to start said cam and speed it up to the limited range of high speeds, where each successive cam projection applies a cam push for each successive rearward swing of the diaphragm, for the purposes described.

6. In an alarm or signaling apparatus, a thin elastic metal diaphragm, in combination with a rotary cam and means for adjusting the same toward and from said diaphragm, said means including an accurately adjustable thrust member adapted to force the cam in one direction, a spring member adapted to act in the opposite direction and locking means for insuring permanence of the adjustment.

7. In an alarm or signaling apparatus, a horn or resonator, and a thin elastic metal diaphragm therefor, in combination with a rotary cam and means for adjusting the same toward and from said diaphragm, said means including an adjustable thrust screw adapted to limit movement of the cam away from the diaphragm, a spring member adapted to act in the opposite direction throughout the range of operative adjustment of said cam and means for locking the parts in adjusted position.

8. In an alarm or signaling apparatus, a horn, a thin elastic metal diaphragm, a closed case for the rear side of said diaphragm comprising a transverse wall spaced from said diaphragm and marginal portions clamped to the periphery of said diaphragm, in combination with a drive shaft extending through said case, a rotary cam mounted upon said shaft and disposed within said diaphragm case, an adjusting screw movable endwise toward and from said diaphragm for moving said shaft toward the diaphragm and a spring having its end portions supported by said diaphragm case and its intermediate portion bowed away from said diaphragm to normally hold said shaft and rotary cam the maximum adjusted distance away from the diaphragm.

9. In an alarm or signaling apparatus, a horn or resonator and a diaphragm therefor, in combination with a rotary cam, a case in the rear of said diaphragm inclosing said rotary cam, and adjustable means extending through the case for adjusting said cam toward and from said diaphragm.

10. In an alarm or signaling apparatus, a horn or resonator and a diaphragm therefor, in combination with a rotary cam, a case in the rear of said diaphragm inclosing said rotary cam, adjustable means arranged for adjusting said cam toward and from said diaphragm while said cam is running and means for locking said parts in adjusted position.

11. In an alarm or signaling apparatus, a suitable support, a diaphragm and a rotary cam, in combination with a bearing for said cam, said bearing being mounted for adjustment about an axis eccentric to the axis of said cam, whereby said cam may be adjusted to and from said diaphragm.

12. In an alarm or signaling apparatus, a suitable support, a diaphragm and a rotary cam, in combination with a bearing for said cam, said bearing being mounted for adjustment about an axis eccentric to the axis of said cam, a rear casing inclosing said cam, and a screw adapted to be operated from outside of the casing for adjusting said bearing about said axis.

13. In an alarm or signaling apparatus, a suitable support, a diaphragm and a rotary cam, in combination with a bearing for said cam, said bearing being mounted for adjustment about an axis eccentric to the axis of said cam, a rear casing inclosing said cam, and adjustable means carrying a lock nut, extending through the casing and adapted to be operated from the outside of said casing, for adjusting said bearing about said axis and for locking the parts in the adjusted position.

14. In an alarm horn or signaling apparatus, a vibratory member, a rotary cam for agitating the same and a flexible shaft for driving said rotary cam, in combination with a friction wheel connected to said flexible shaft, an independently operated motor, and means for moving said friction wheel into frictional engagement with a moving part of the motor, substantially as described.

15. In an alarm or signaling device of the class described, a casing inclosing a diaphragm, a wear-piece, and a rotary displacing member adapted to engage said wear-piece, in combination with an oil discharge opening in said case, said parts being constructed and arranged so that oil from said opening may be discharged on said rotary member and thence driven by centrifugal force to said wear-piece, substantially as described.

16. In an alarm or signaling apparatus of the class described, a diaphragm, a high speed rotary cam adapted to contact with said diaphragm, and a bearing for the shaft of said cam, all arranged for operation with said cam in a position over said bearing, an axial passage in said cam shaft leading from above said cam and terminating below said cam at a point adjacent said bearing, in combination with means for discharging oil into said passage at a point above said cam whereby such oil may ultimately reach the cam face, substantially as and for the purpose set forth.

17. In an alarm horn or signaling device, the combination of a case having openings therein, a diaphragm, a rotary displacing member adapted to vibrate said diaphragm and a shaft therefor passing through one such opening, an oil cup on the case in line with the shaft and mounted in the other such opening, and means for attaching the case to a suitable support at right angles to the axis of said shaft, the connections of the oil cup and the shaft being reversible, substantially as described.

18. In an alarm horn or signaling device, the combination of a case having openings therein, a diaphragm, a rotary displacing member adapted to vibrate said diaphragm and a shaft therefor passing through one such opening, an oil cup on the case in line with the shaft and mounted in the other such opening and means for attaching the case to a suitable support at right angles to the axis of said shaft, the shaft bearing, shaft connections and oil cup being reversible, substantially as described.

19. In an alarm horn or signaling apparatus, a vibratory diaphragm, a rotary cam for actuating the same, having its axis arranged at right angles to the grain of the metal of the diaphragm, substantially as described.

20. An alarm or signal comprising a thin elastic steel diaphragm of the type described, clamped about its edges and having its central portion provided with a suitable wear-piece in combination with a rotary cam having a plurality of projections of a pitch adapted to apply direct outward thrusts to the wear-piece on lines falling within the base thereof, the distance and depth between successive projections being sufficient to permit swing of said diaphragm rearwardly of its normal position, means for mounting said cam with only the outermost portions of the cam projections overlapping the normal position of said wear-piece, and means for rotating said cam at speeds sufficient to impart to said wear-piece a series of outward swings at time intervals frequent enough to give a push for every swing and yet permit a free elastic return swing of the diaphragm extending to a substantial distance rearwardly of normal, the entry of the wear-piece between adjacent cam projections, and the engagement of the successive cam projections with the wear-piece while the latter is in the rear of normal, whereby the principal sound producing vibration of said diaphragm is a bodily swing, wholly on one side of normal and then wholly on the other, for the purpose described.

21. An alarm or signaling device of the class described, including a thin elastic steel diaphragm, a wear-piece formed with a hard metal tip, a shank riveted through the diaphragm and a diaphragm engaging base of greater diameter than the altitude of said wearpiece, a rotary cam provided with a plurality of cam projections having surfaces of low pitch, means for supporting said cam and said diaphragm with the path of the outermost portions of the cam projections but slightly overlapping the normal position of the tip of the wear-piece, the space between said cam projections being of a depth and circumferential extent sufficient to permit entry of the wear-piece tip and rearward swings of the diaphragm to a substantial distance behind normal, and the pitch of the cam surfaces being such that the lines of thrust of the cam fall within the base of the wear-piece, and means controlled by the operator for rapidly driving said rotary cam up to a speed sufficient to give to the diaphragm bodily movement wholly on one side and then wholly on the other side of normal and to impart a forcing movement to that portion of every swing which is substantially in the rear of the normal, for the purpose described.

22. In an alarm or signaling apparatus, a horn, a thin elastic steel diaphragm clamped about its edges and having a suitable wear-piece secured to the central portion thereof, in combination with means for causing wide, swift to-and-fro swings of said central portion, said means including a rotary cam having a plurality of spaced projections of a pitch adapted to apply direct outward thrusts to the wear-piece, the distance and depth between successive projections being sufficient to permit free inward swing of said diaphragm and wear-piece rearwardly of normal, means for mounting said cam with only the outermost portions of the cam projections overlapping the normal position of said wear-piece, means for minutely adjusting the degree of such overlap, and power operated driving means of the type adapted to automatically accommodate the speed of the cam to the work done on the diaphragm, designed and arranged to start said cam and rotate it through subnormal speeds producing only small amplitude vibrations of small power and rapidly accelerating to the speeds where wide amplitude bodily swings extending on both sides of normal are built up by cam pushes commencing only during the times when the diaphragm is in the rear of normal, for the purpose described.

23. In an alarm or signaling apparatus, a thin, elastic, steel diaphragm clamped about its edges and having a suitable wear-piece secured to the central portion thereof, in combination with means for causing wide, swift, to-and-fro swings of said central portion, said means including a rotary cam having a plurality of spaced projections presenting cam surfaces of a pitch adapted to apply direct outward thrusts to the wear-piece, the spaces between successive projections being of sufficient depth to permit free inward swing of the diaphragm and wear-piece rearwardly of normal and the overlap of cam projections and wear-piece being slight, a driving member, and power transmitting means between said driving member and said cam adapted to vary the speed of the cam in accordance with the pressure manually applied by the operator and in accordance with the work done upon the diaphragm whereby the operator, by applying sufficient pressure, may cause said cam to rotate through subnormal speeds producing only small amplitude vibrations of small power and rapidly accelerating to a speed building up wide amplitude swings extending to both sides of normal with cam contacts applied only during the times when the diaphragm is in the rear of normal, for the purpose described.

24. In an alarm or signaling apparatus, a thin, elastic, metal diaphragm of the class described, clamped about its edges and provided with a suitable wear-piece, in combination with means for causing, wide, swift, to-and-fro swings of the central portion of the diaphragm, said means including a rotary cam having a plurality of spaced projections presenting cam surfaces adapted to propel said diaphragm as a whole in the outward direction, the spaces between successive projections being of sufficient depth to permit inward swing of the diaphragm and wear-piece rearwardly of normal, means for supporting said parts with only the outermost portions of the cam projections adapted to engage said wear-piece when the diaphragm is in normal position, and power operated driving means of the type adapted to automatically accommodate the speed of the cam to the work done on the diaphragm, designed and arranged to start said cam and rapidly accelerate it to that limited range of high speeds where wide amplitude bodily swings, extending on both sides of normal, are built up by each successive cam projection contacting with the wear-piece during the rear-of-normal portion of each successive swing, for the purpose described.

Signed at West Orange, county of Essex and State of New Jersey, this 12th day of November, A. D. 1915.

MILLER REESE HUTCHISON.

Copies of this patent may be obtained for five cents each, by addressing the "Commissioner of Patents, Washington, D. C."